United States Patent
Rehmat et al.

(10) Patent No.: US 10,237,840 B2
(45) Date of Patent: Mar. 19, 2019

(54) PROVIDING A PUBLIC INTERNET PROTOCOL ADDRESS DURING WI-FI CALLING REGISTRATION (71) Applicant: T-Mobile USA, Inc., Bellevue, WA (US)

(72) Inventors: Umair Rehmat, Redmond, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 59 days.

(21) Appl. No.: 15/278,946

(22) Filed: Sep. 28, 2016

(65) Prior Publication Data
US 2017/0339654 A1 Nov. 23, 2017

Related U.S. Application Data (60) Provisional application No. 62/337,660, filed on May 17, 2016.

(51) Int. Cl.
H04W 60/00 (2009.01)
H04L 29/12 (2006.01)
(Continued)

(52) U.S. Cl.
CPC ......... H04W 60/00 (2013.01); H04L 61/2007 (2013.01); H04L 65/1016 (2013.01); H04L 65/1073 (2013.01); H04W 48/16 (2013.01); H04L 61/2015 (2013.01); H04L 61/2514 (2013.01); H04L 61/2575 (2013.01); H04W 84/12 (2013.01)

(58) Field of Classification Search
CPC .......... H04L 2012/5608; H04W 84/12; H04W 88/08; H04W 80/04; H04W 88/06; H04W 84/18; H04W 74/08; H04W 36/03
USPC ............. 370/349, 310.2, 328, 338, 331, 332
See application file for complete search history.

(56) References Cited

U.S. PATENT DOCUMENTS

2003/0206536 A1* 11/2003 Maggenti ................ H04L 12/66
370/328
2004/0203765 A1* 10/2004 Das ........................ H04W 8/04
455/435.1
(Continued)

OTHER PUBLICATIONS

3GPP, "3rd Generation Partnership Project; Technical Specification Group Core Network and Terminals; IP multimedia cell control protocol based on Session Initiation Protocol (SIP) and Session Description Protocol (SDP); Stage 3 (Release14)," copyright 2016. 3GPP Organizational Partners, 932 pages (most relevant section is 4.7.5 (p. 78)).

(Continued)

Primary Examiner — Brenda H Pham
(74) Attorney, Agent, or Firm — Lee & Hayes, P.C.

(57) ABSTRACT

The systems, devices, and methods discussed herein are directed to a Wi-Fi calling (WFC) portable communication device, or a user equipment (UE), for providing a location information during a registration with a wireless local area network (WLAN). During a registration with a WLAN, the WFC UE may send a request for obtaining a public Internet Protocol (IP) address information of the WLAN, which includes location information of the WLAN, and use the public IP address of the WLAN as the assigned IP address of the WFC UE to register with the WLAN.

10 Claims, 8 Drawing Sheets (51) Int. Cl.
*H04L 29/06* (2006.01)
*H04W 48/16* (2009.01)
*H04W 84/12* (2009.01)

(56) References Cited

U.S. PATENT DOCUMENTS

| | | |
|---|---|---|
| 2006/0172732 A1 | 8/2006 | Nylander et al. |
| 2007/0264979 A1 | 11/2007 | Park et al. |
| 2013/0155876 A1* | 6/2013 | Potra ............... H04W 36/14 370/248 |
| 2013/0230036 A1* | 9/2013 | Reznik ............... H04L 67/16 370/338 |
| 2014/0016612 A1* | 1/2014 | Montemurro ......... H04W 8/087 370/331 |
| 2016/0105541 A1 | 4/2016 | Bonner |
| 2016/0105780 A1 | 4/2016 | Hooker et al. |

OTHER PUBLICATIONS

PCT Search Report and Written Opinion dated Aug. 24, 2017 for PCT Application No. PCT/US17/32706, 12 pages.

* cited by examiner

PROVIDING A PUBLIC INTERNET PROTOCOL ADDRESS DURING WI-FI CALLING REGISTRATION

CROSS-REFERENCE TO RELATED APPLICATIONS

This application is a non-provisional of, and claims priority to and the benefit of, U.S. Provisional Patent Application Ser. No. 62/337,660, filed May 17, 2016 and entitled "PROVIDING A PUBLIC IP ADDRESS DURING WFC REGISTRATION," the entirety of which is incorporated herein by reference.

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

In addition, a new generation of portable communication devices, or user equipment (UE), are capable of making phone calls over a wireless local area network (WLAN), referred as Wi-Fi™ calling or WFC. To be able to make or receive a call through a WLAN, the WFC UE first registers its Internet Protocol (IP) address with the WLAN. When the WFC UE makes a Wi-Fi emergency call, the IP address that the UE used to register is provided to a 911 communication center known as a Public Safety Answering Point (PSAP). However, unlike a traditional geographical address, the IP address of the UE may not provide a physical location of the UE, which may be crucial.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and methods discussed herein are directed to a Wi-Fi calling (WFC) portable communication device, or a user equipment (UE), for providing a location information during a registration with a wireless local area network (WLAN). Unlike a cellular emergency call, where a Public Safety Answering Point (PSAP) receives an identification of a cell site/sector location information of the call origin, the PSAP receives an assigned Internet Protocol (IP) address of the UE for a Wi-Fi emergency call. For a WFC UE using Transport Layer Security (TLS) based gateways or Access Service Border Controllers (A-SBCs), the WFC UE sends the assigned IP address in the contact header of the Internet Protocol Multimedia System (IMS) registration message. For example, the IP address may be assigned via Dynamic Host Control Protocol (DHCP). For the WFC based on evolved packet data gateway (ePDG) solutions, the contact header Uniform Resource Identifier (URI) may contain a private IP assigned by the ePDG, or an Internet Protocol Version 4 (IPv4) or Version 6 (IPv6) address, depending on the implementation, assigned to the UE by the ePDG during an Internet Protocol Security (IPSec) setup. A user of the WFC UE may register an address associated the WFC UE, however, if the IP address fails to resolve a location of the WFC UE, the registered address may not represent where a WFC call is coming from due to the mobile nature of the UE.

In some examples, during a registration with a WLAN, the WFC UE may send a request for obtaining a public IP address information of the WLAN, which includes location information of the WLAN, and use the public IP address of the WLAN as the assigned IP address of the WFC UE to register with the WLAN.

In some examples, during a registration with a WLAN, the WFC UE checks its assigned IP address to determine whether the assigned IP address, which may be a private or public, may be used to provide a current location information of the WFC UE. If the assigned IP address is a public IP address, the WFC UE may continue to use the assigned IP address. If the assigned IP address is a private IP address, the WFC UE may send a request for obtaining a public IP address information of the WLAN, which includes location information of the WLAN, and use the public IP address of the WLAN as the assigned IP address of the WFC UE to register with the WLAN.

The WFC UE may then populate the assigned IP address in a contact field of a header of a protected registration message or in a private field of a protected registration message to complete the registration process with the WLAN.

The systems, devices, and methods described herein can be implemented in a number of ways. Example implementations are provided below with reference to the following figures.

Figure 1:
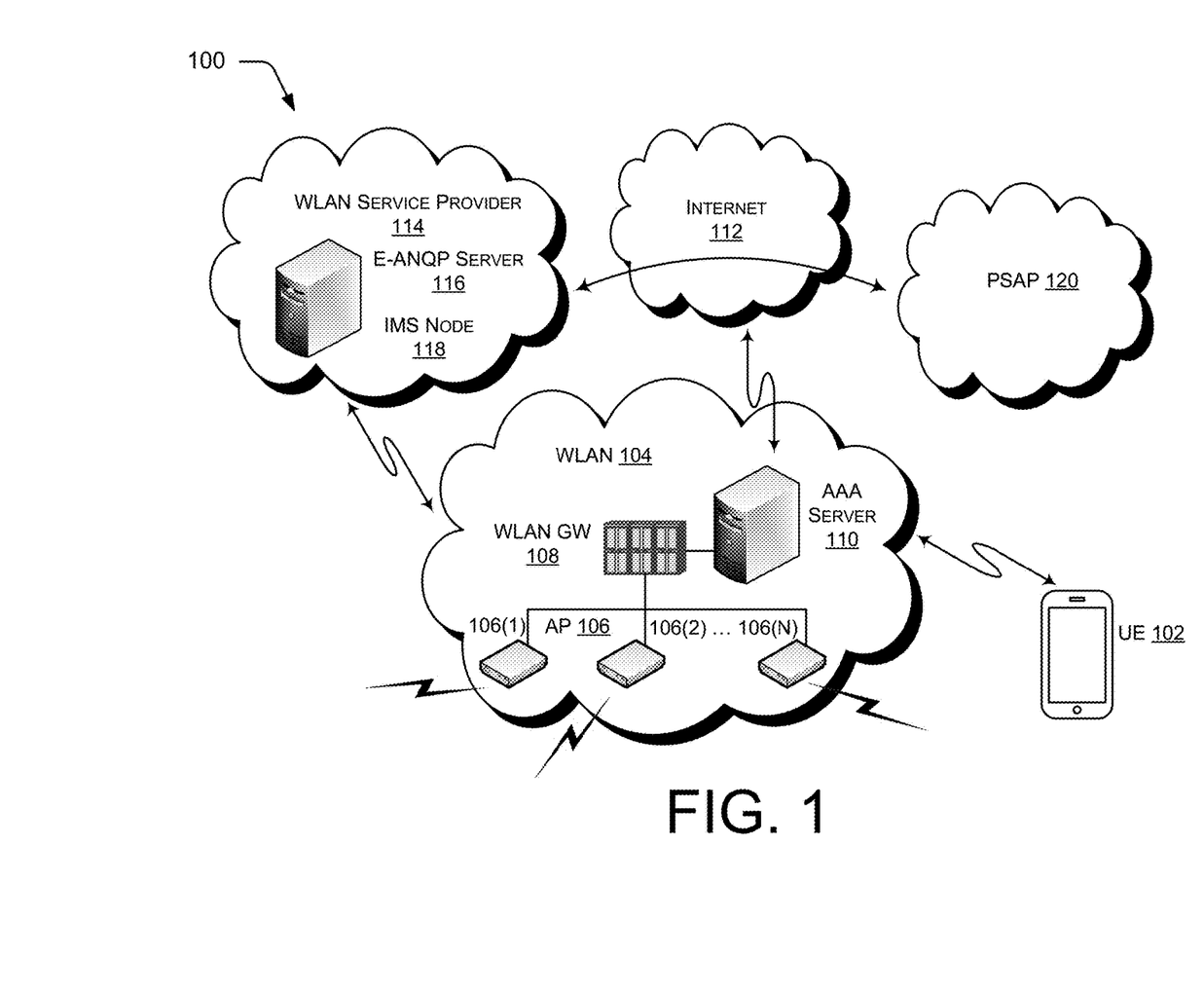
FIG. 1 illustrates an example environment in which a portable communication device, or user equipment (UE), registers with a wireless local area network (WLAN).

FIG. 1 illustrates an example environment 100 in which a Wi-Fi calling (WFC) portable communication device, or user equipment (UE), 102 registers with a wireless local area network (WLAN), 104. The WLAN 104 comprises N access points (AP) 106 of which three (106(1), 106(2), and 106(N))

are shown, a WLAN gateway (GW) 108 communicatively coupled to the AP 106, and an authentication, authorization, accounting (AAA) server 110 communicatively coupled to the WLAN GW 108. The AP 106 is a transceiver that connects a WLAN device, such as the UE 102, to the WLAN. The WLAN GW 108 routes data packets from the AP 106 to other network and vice versa. The WLAN GW 108 may be Transport Layer Security (TLS) based gateway via an Access Service Border Controller (A-SBC). The WLAN GW108 may also be an evolved packet data gateway (ePDG). The AAA server 110 tracks user activities by authenticating the user with unique identifying information, authorizing the user to access the network and services, and accounting, or tracking, the activities of the user. The AAA server 110 may be connected other servers via Internet 112. The WLAN 104 is communicatively couple to a WLAN service provider 114 which provides services accessible through APs 106 to devices registered with the WLAN 104. The WLAN service provider 114 comprises an enhanced access network quality protocol (E-ANQP) server 116, which WLAN devices, such as the UE 102, use to perform network discovery, and an Internet Protocol Multimedia Subsystem (IMS) node 118, which may be a Proxy Call Session Control Function (P-CSCF). In case of an emergency call such as an E911 from the UE 102, a 911 communication center, known as a Public Safety Answering Point (PSAP), 120, receives an assigned IP address of the UE 102. The UE 102 is capable of establishing communication with a wireless local area network such as the WLAN 104 and may also be capable of establishing communication with a cellular network (not shown).

The UE 102 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the UE 102 as being "mobile," (i.e., configured to be carried and moved around) it is to be appreciated that the UE 102 may represent various types of communication devices that are generally stationary as well, such as televisions, desktop computers, game consoles, set top boxes, and the like. In this sense, the terms "communication device," "wireless device," "wireline device," "mobile device," "computing device," and "user equipment" may be used interchangeably herein to describe any communication device capable of performing the techniques described herein. Furthermore, the UE 102, as well as the trusted and untrusted Radio Access Networks (RANs), may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

Figure 2:
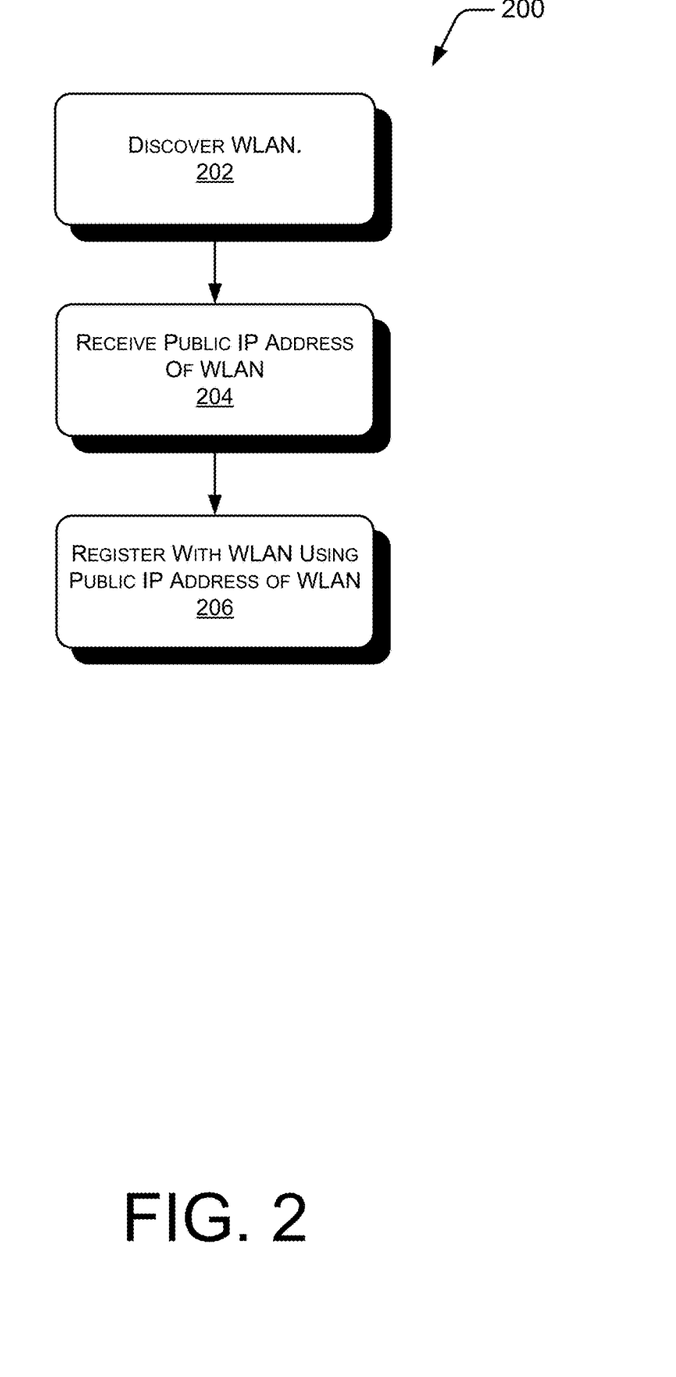
FIG. 2 illustrates an example process for the UE to provide an assigned IP address that comprises a current location information of the UE during a registration process with the WLAN.

FIG. 2 illustrates an example process 200 for the UE 102 to provide an assigned IP address of the UE 102, which comprises a current location information of the UE 102, during a registration process with the WLAN 104. In block 202, the UE 102 may discover an available WLAN, such as the WLAN 104, with an assistance from the E-ANPQ server 116 as described above. In block 204, the UE 102 may receive a public IP address of the WLAN 104, which may be indicative of a location of the WLAN104, and may register with the WLAN 104 using the public IP address of the WLAN 104 as an assigned IP address of the UE 102, thereby providing the location of the WLAN 104 as the location of the UE 102.

Figure 3:
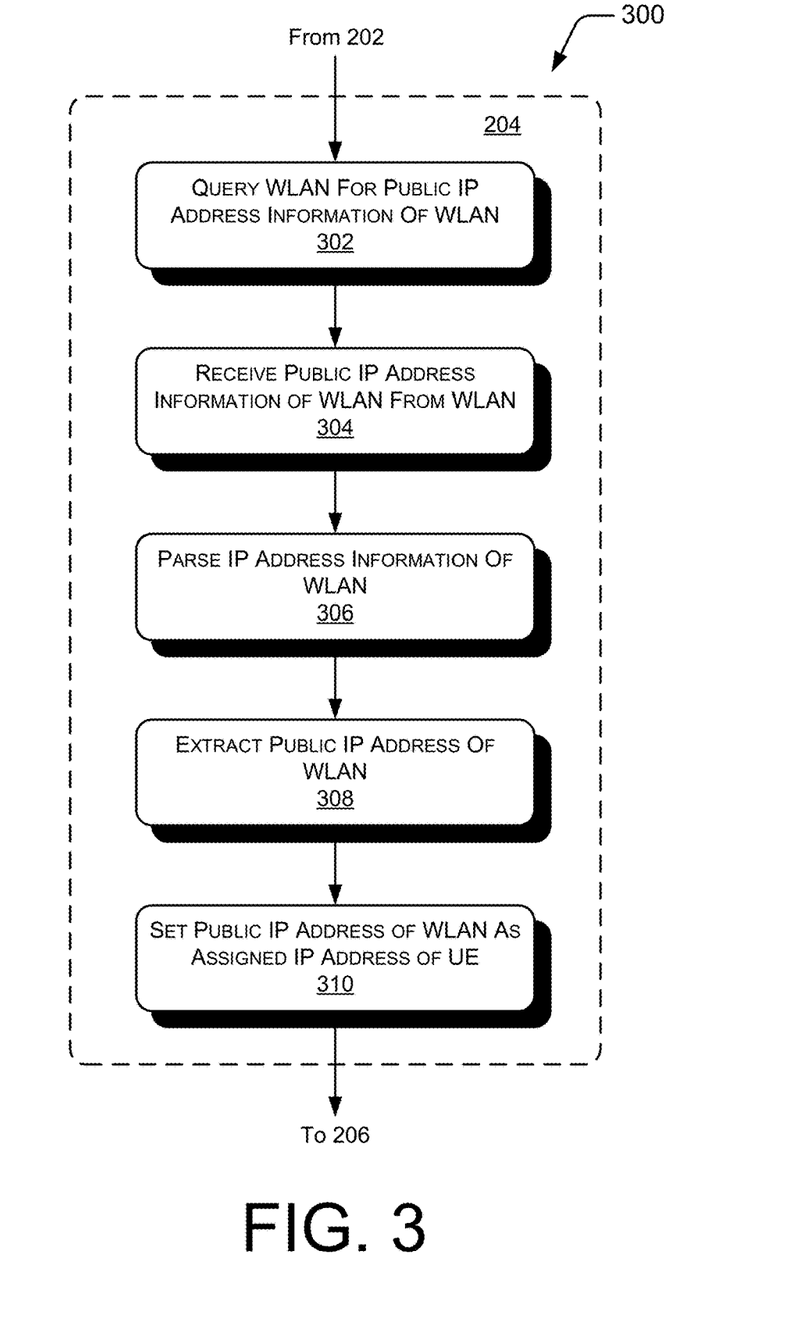
FIG. 3 illustrates an example process detailing one of the blocks of FIG. 2.

FIG. 3 illustrates an example process 300 detailing block 204 of FIG. 2. In block 302, the UE 102 may query the WLAN 104 for a public IP address information associated with the WLAN 104. The UE 102 may query for the public IP address, for example, by sending a Hypertext Transfer Protocol (HTTP) GET request to a Uniform Resource Locator (URL) such as checkup.dyndns.org. Because the HTTP GET is sent to public servers, multiple URLs may be contacted in case of a failure. In response to the HTTP GET request, the UE 102 may receive the public IP address information of the WLAN 104 in a text format from the WLAN 104 in block 304. For example, a returned response may be in a form of:

```
<htm><head><title>Current IP Check</title></head><body>Current IP
Address:
206.29.180.75</body></html>\r\n
``` where 206.29.180.75 is the public IP address of the WLAN 104.

Although the HTTP GET is described above for obtaining the public IP address, other suitable methods may be utilized to obtain the public IP address based on a specific situation or environment such as HTTP over TLS (HTTPS), application programming interface (API) initiated by the UE 102 towards a specific server, or any other environment in which the UE 102 may obtain the public IP address.

In block 306, the UE 102 may parse the received public IP address information associated with the WLAN 104, and extract the public IP address, 206.29.180.75 in this example, of the WLAN 104 from the received public IP address information associated with the WLAN 104 in block 308. In block 310, the UE 102 may set the public IP address of the WLAN 104, which has been extracted in block 308 above, as the assigned IP address of the UE 102. The process then proceeds to block 206.

Figure 4:
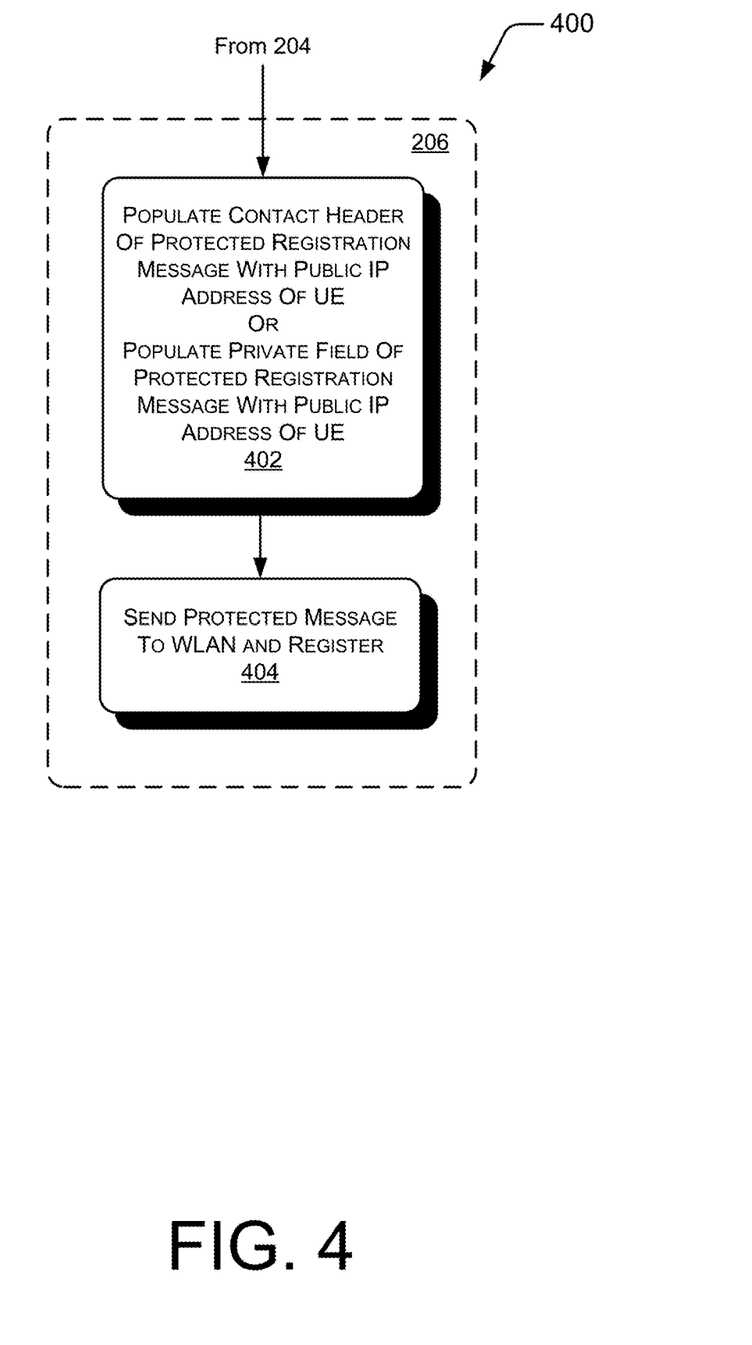
FIG. 4 illustrates an example process detailing another one of the blocks of FIG. 2.

FIG. 4 illustrates an example process 400 detailing block 206 of FIG. 2. In block 402, the UE 102 may populate a private field of a protected registration message with the public IP address of the UE 102, or populate a contact header of the protected registration message with the public IP address of the UE 102.

For a WFC implementation based on an Internet Protocol Version 4 (IPv4) or Version 6 (IPv6), the IMS node 118, may parse the public IP address of the WLAN 104, which includes location information of the WLAN 104, and populate the private field of the protected registration message with the extracted public IP address as shown below.

```
P-Public-IP:
    IPv4:206.29.180.75;IPv6:<IPv6 Address if applicable>
```

For a WFC implementation based on evolved packet data gateway (ePDG) solutions, the contact header of the protected registration message may be populated with the public IP address of the UE 102. Header modification capabilities of the P-CSCF 118 may be utilized to parse the public IP address of the WLAN 104 and populate the "Received" parameter in 'via' header of the secure registration message as shown below (emphasis added).

```
Contact:<sip:12063318200@
fd36:5764:f74c:aa73:xxxx:xxxx:xxxx:xxxx:49986;transport=tls>;expires=
3600;audio;+sip.instance="<urn:uuid:6d7bdefa-f9e5-3d4f-850a-
d7fa6acf1f86>";reg-id=1;+lines1;+g.3gpp.icsi-ref="urn%3Aurn-
7%3A3gpp-service.ims.icsi.oma.cpm.session,urn%3Aurn-7%3A3gpp-
service.ims.icsi.oma.cpm.filetransfer,urn%3Aurn-7%3A3gpp-
service.ims.icsi.oma.cpm.msg,urn%3Aurn-7%3A3gpp-
service.ims.icsi.oma.cpm.largemsg,urn%3Aurn-7%3A3gpp-
service.ims.icsi.oma.cpm.systemmsg,urn%3Aurn-7%3A3gpp-
service.ims.icsi.mmtel";Received=x.x.x.x
```

Via a header modification rule, the public IP address of the WLAN 104 can be extracted from the contact header and placed in the 'Received' parameter of the via header as shown below (emphasis added).

```
Via: SIP/2.0/UDPepgrvs02.pcf.sip.tmobile.com:5062;rport;branch=
z9hG4bKmavodi-c-116-e-a-e0ff0000-31ce631a1f8f8677,SIP/2.0/TLS
192.168.29.125:49986;Realm=realm-gm;NwkIntf=1;
recvdSrvPort=5061;recvdSrvIp="208.54.65.108"; mav-tcp-rport=49987;
Received: 50.149.117.205; Branch: z9hG4bKFGa4c4OgulgC20b2g;
RPort: 49987
```

The UE 102 then sends the protected registration message, which now includes the public IP address of the WLAN 104 as the assigned IP address of the UE 102, to the WLAN 104, and registers with the WLAN 104 in block 404.

The functionality of the P-CSCF 118 may also be utilized for IMS servers further down the network/communication path. For example, the UE 102 sends to the P-CSCF 118 a protected registration message with the public IP address in the Received parameter of the contact header as described above, the P-CSCF 118 may then apply the header modification rule to extract the public IP address, populate the public IP address in the VIA header, and forward the protected registration message to other servers further down the path communicatively coupled to the WLAN 104. The other servers may then be able to extract the location information associated with the public IP address, i.e. the location of the WLAN 104 and the UE 102. Header modification capabilities of the P-CSCF 118 have been described above as an example. Depending on the environment and associated equipment and technologies, any other header modification rules appropriate for the environment may be utilized.

Figure 5:
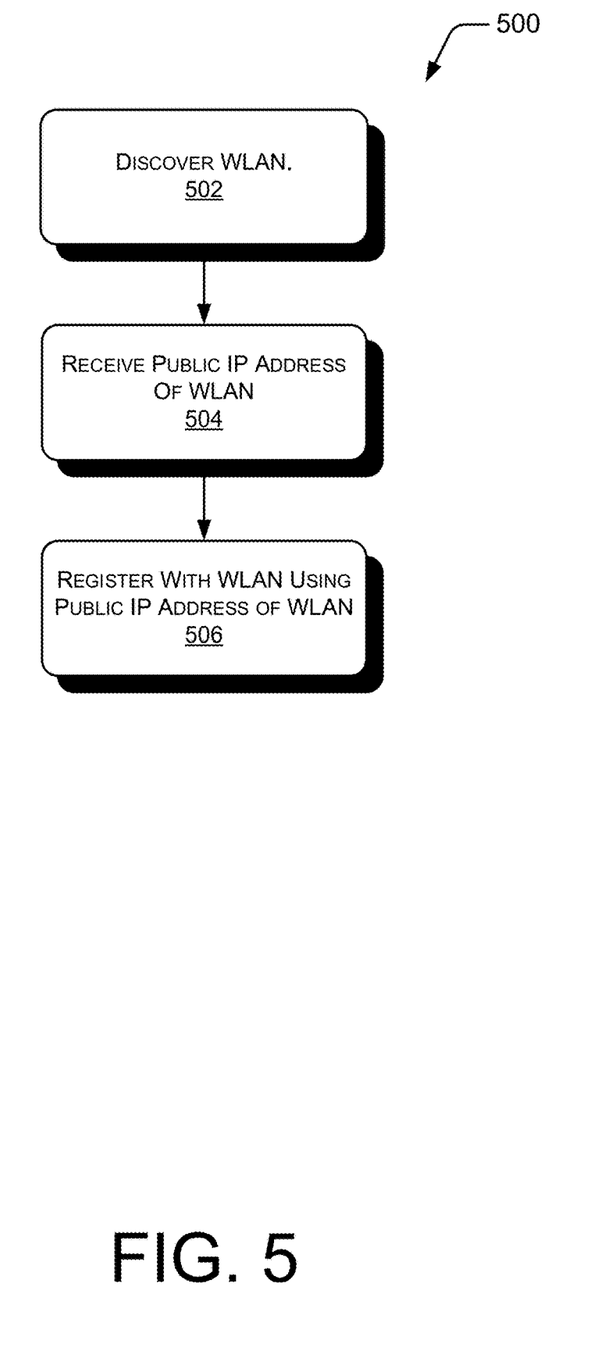
FIG. 5 illustrates another example process for the UE to provide an assigned IP address that comprises a current location information of the UE during a registration process with the WLAN.

FIG. 5 illustrates an another example process 500 for the UE 102 to provide an assigned IP address of the UE 102, which comprises a current location information of the UE 102, during a registration process with the WLAN 104. In block 502, the UE 102 may discover an available WLAN, such as the WLAN 104, with an assistance from the E-ANPQ server 116 as described above. In block 504, the UE 102 may receive a public IP address of the WLAN 104, which comprises location information of the WLAN104, and may register with the WLAN 104 using the public IP address of the WLAN 104 as an assigned IP address of the UE 102 in block 506.

Figure 6:
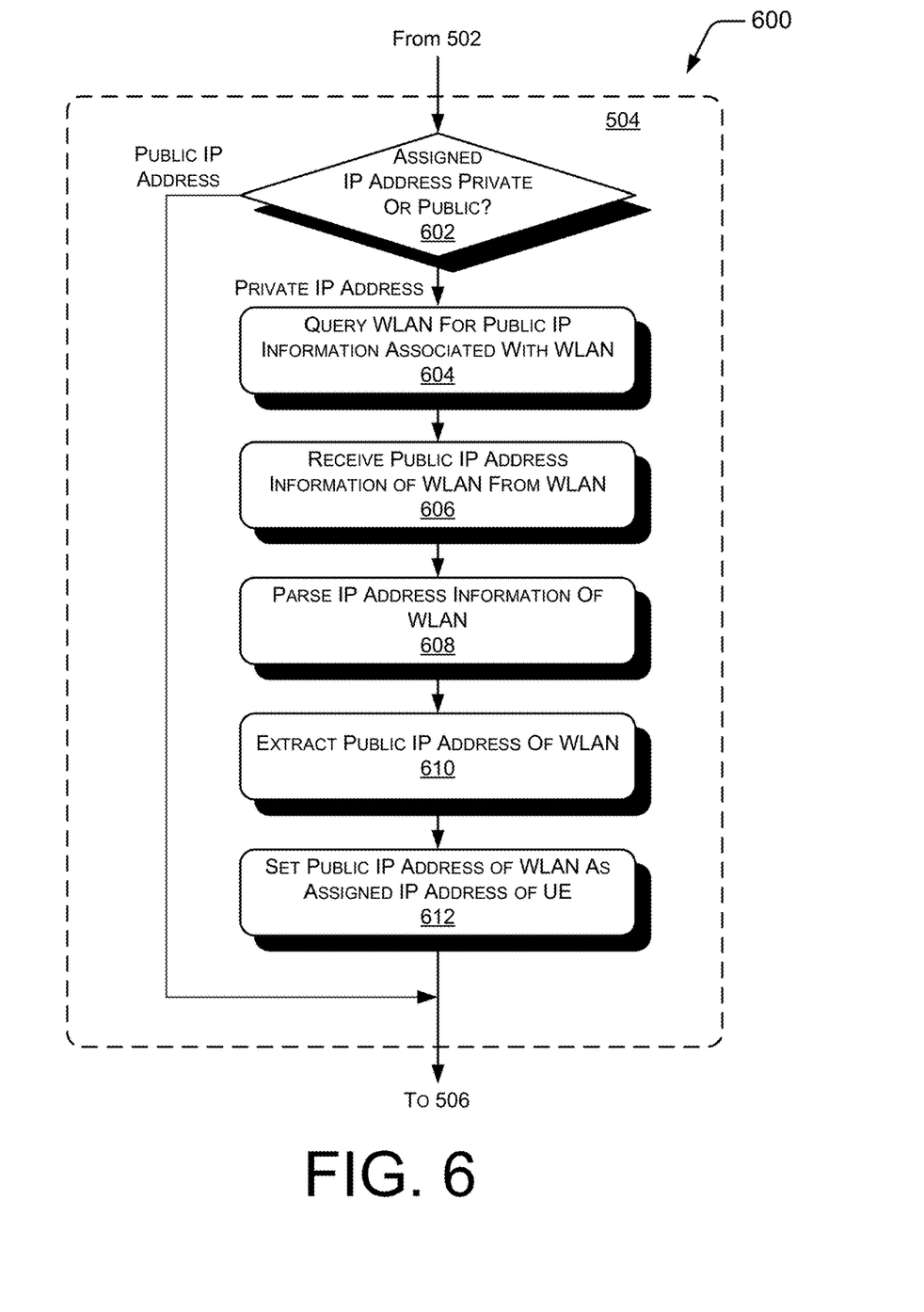
FIG. 6 illustrates an example process detailing one of the blocks of FIG. 5.

FIG. 6 illustrates an example process 600 detailing block 504 of FIG. 5. In block 602, the UE 102 may determine whether the assigned IP address of the UE 102 is a public IP address or a private IP address. If the assigned IP address of the UE 102 is determined to be a public IP address indicative of the current location of the UE 102 in block 602, then the process proceeds to block 506.

If the assigned IP address of the UE 102 is determined to be a private IP address in block 602, the UE 102 may query the WLAN 104, in block 604, for a public IP address information associated with the WLAN 104, which comprises location information of the WLAN 104. The query may be made as described above with reference to block 302. In response to the query, the UE 102 may receive the public IP address information associated with the WLAN 104 from the WLAN 104 in block 606 as described above with reference to block 304. In block 608, the UE 102 may parse the received public IP address information associated with the WLAN 104 as described above with reference to block 306, and extract the public IP address of the WLAN 104 from the received public IP address information associated with the WLAN 104 in block 610 as described above with reference to block 308. In block 612, the UE 102 may set the public IP address of the WLAN 104 as the assigned IP address of the UE 102 as described with reference to block 310. The process then proceeds to block 506.

Figure 7:
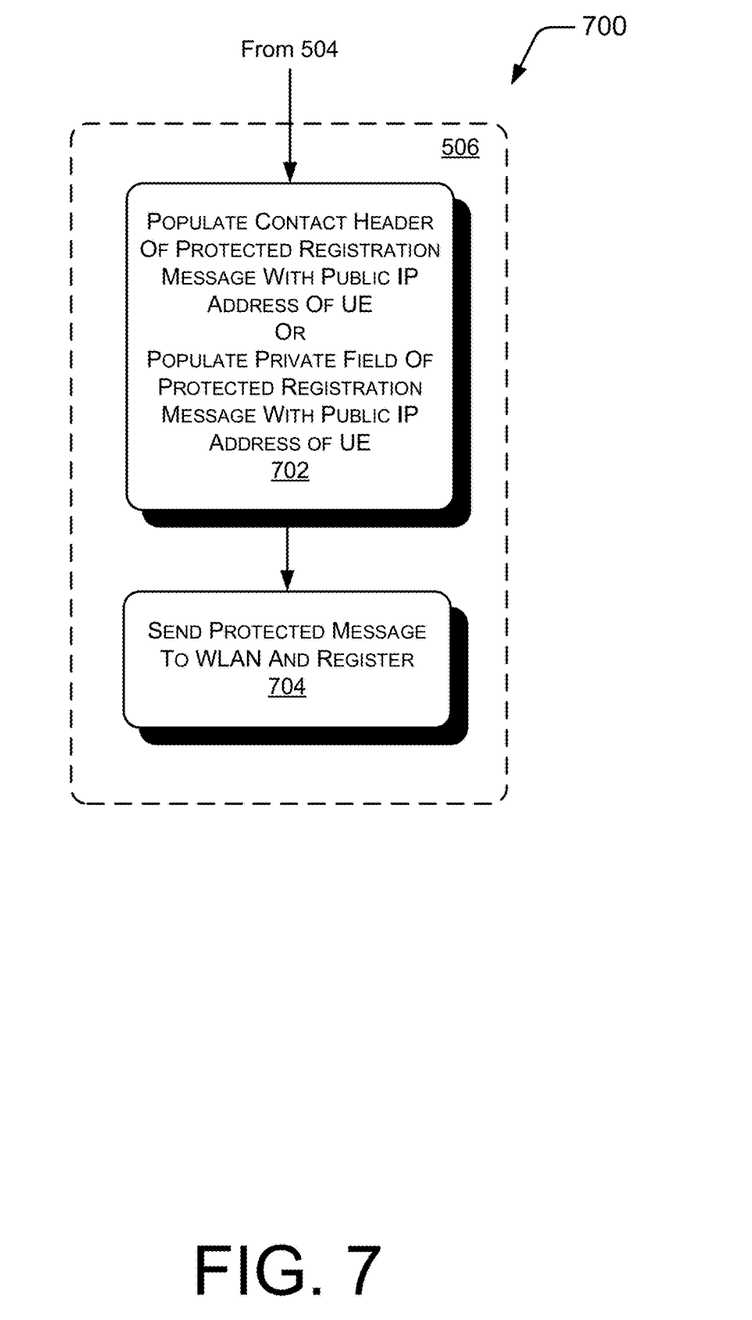
FIG. 7 illustrates an example process detailing another one of the blocks of FIG. 5.

FIG. 7 illustrates an example process 700 detailing block 506 of FIG. 5. In block 702, the UE 102 may populate a private field of a protected registration message with the public IP address of the UE 102, or populate a contact header of the protected registration message with the public IP address of the UE 102 as described above with reference to block 402.

For a WFC implementation based on an IPv4 or IPv6, the IMS node 118, may parse the public IP address of the WLAN 104 and populate the private field of the protected registration message as shown below.

```
P-Public-IP:
    IPv4:206.29.180.75;IPv6:<IPv6 Address if applicable>
```

For a WFC implementation based on evolved packet data gateway (ePDG) solutions, the contact header of the protected registration message may be populated with the public IP address of the UE 102. Header modification capabilities of the P-CSCF 118 may be utilize to parse the public IP address of the WLAN 104 and populate the "Received" parameter in 'via' header of the secure registration message as shown below (emphasis added).

```
Contact:<sip:12063318200@
fd36:5764:f74c:aa73:xxxx:xxxx:xxxx:xxxx:49986;transport=tls>;expires=
3600;audio;+sip.instance="<urn:uuid:6d7bdefa-f9e5-3d4f-850a-
d7fa6acf1f86>";reg-id=1;+lines1;+g.3gpp.icsi-ref="urn%3Aurn-
7%3A3gpp-service.ims.icsi.oma.cpm.session,urn%3Aurn-7%3A3gpp-
service.ims.icsi.oma.cpm.filetransfer,urn%3Aurn-7%3A3gpp-
service.ims.icsi.oma.cpm.msg,urn%3Aurn-7%3A3gpp-
service.ims.icsi.oma.cpm.largemsg,urn%3Aurn-7%3A3gpp-
service.ims.icsi.oma.cpm.systemmsg,urn%3Aurn-7%3A3gpp-
service.ims.icsi.mmtel";Received=x.x.x.x
```

Via a header modification rule, the public IP address of the WLAN 104 can be extracted from the contact header and placed in the 'Received' parameter of the via header as shown below (emphasis added).

```
Via: SIP/2.0/UDPepgrvs02.pcf.sip.tmobile.com:5062;rport;branch=
z9hG4bKmavodi-c-116-e-a-e0ff0000-31ce631a1f8f8677,SIP/2.0/TLS
192.168.29.125:49986;Realm=realm-gm;NwkIntf=1;
recvdSrvPort=5061;recvdSrvIp="208.54.65.108"; mav-tcp-rport=49987;
Received: 50.149.117.205; Branch: z9hG4bKFGa4c4OgulgC20b2g;
RPort: 49987
```

The UE 102 then sends the protected registration message to the WLAN 104 and registers with the WLAN 104 in block 704.

Figure 8:
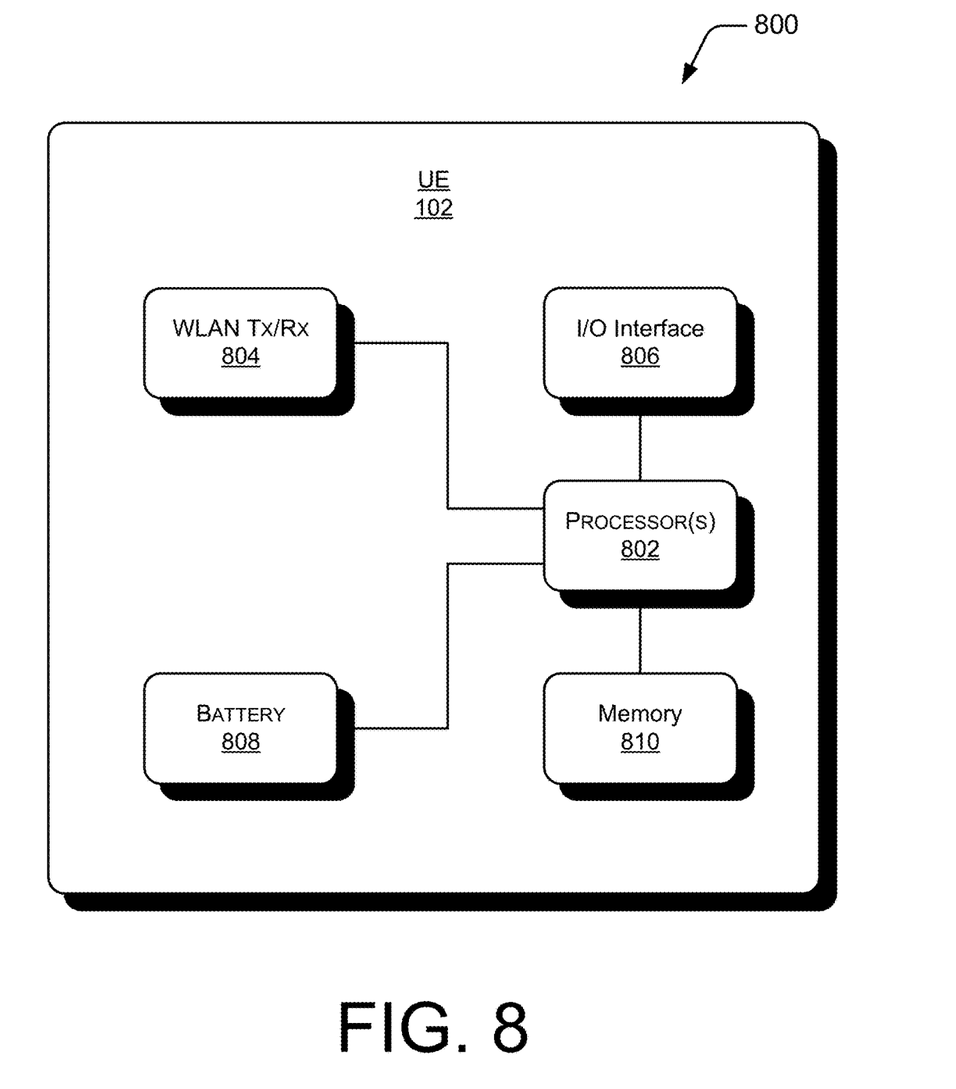
FIG. 8 illustrates an example process for a mobile network operator to provide the UE access to services through an associated WLAN in accordance with at least one aspect of the present disclosure.

FIG. 8 illustrates an example block diagram 800 of the UE 102 in accordance with at least one aspect of the present disclosure. The UE comprises one or more processors 802 and a WLAN transceiver 804 communicatively coupled to the one or more processors 802, and may be directly or indirectly coupled to other components and/or modules of the UE 102. In some embodiments, the one or more processors 802 may be a central processing unit (CPU), a graphics processing unit (GPU), or both CPU and GPU, or other processing unit or component known in the art. The WLAN transceiver 804 is configured to establish communication between the UE 102 and a WLAN, such as the WLAN 104 described above, using a WLAN specific communication method such as 802.11 family of standards and the like. The UE 102 further comprises an input/output (I/O) interface 806, a battery 808, and memory 810, each communicable coupled the one or more processors 802 and may be directly or indirectly coupled to other components and/or modules of the UE 102. The I/O interface 806 may include a keyboard, mouse, touch pad, touch screen, microphone, and the like, configured to receive an input from a user and may also include a speaker, display which may be a touchscreen, and the like, configured to provide an output for the user. The battery 808 provides power to all components and modules of the UE 102 requiring power. Memory 810 may include volatile memory (such as random access memory (RAM)) and/or non-volatile memory (such as read-only memory (ROM), flash memory, etc.). Memory 810 may also include additional removable storage and/or non-removable storage including, but not limited to, flash memory, magnetic storage, optical storage, and/or tape storage that may provide non-volatile storage of computer-readable instructions, data structures, program modules, and other data for the UE 102.

Memory 810 is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The computer-executable instructions stored on one or more computer-readable storage media that, when executed by one or more processors, perform operations described above with reference to FIGS. 2-7. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a portable communication device comprising:
discovering a wireless local area network (WLAN);
receiving a public Internet protocol (IP) address of the WLAN, the public IP address of the WLAN indicative of a location of the WLAN, wherein receiving the public IP address of the WLAN comprises:
querying the WLAN for a public IP address information associated with the WLAN;
receiving the public IP address information associated with the WLAN from the WLAN;
parsing the public IP address information associated with the WLAN;
extracting a public IP address of the WLAN from the public IP address information associated with the WLAN; and
setting the public IP address of the WLAN as the assigned IP address of the portable communication device; and
registering with the WLAN using the public IP address of the WLAN as an assigned IP address of the portable communication device.

2. The method of claim 1, wherein registering with the WLAN using the public IP address of the WLAN as the assigned IP address of the portable communication device comprises:
populating a contact header of a protected registration message with the public IP address of the portable communication device; and
sending the protected registration message to the WLAN.

3. The method of claim 1, wherein registering with the WLAN using the public IP address of the WLAN as the assigned IP address of the portable communication device comprises:
populating a private field of a protected registration message with the public IP address of the portable communication device; and
sending the protected registration message to the WLAN.

4. A method in a portable communication device comprising:
discovering a wireless local area network (WLAN);
determining that an assigned Internet protocol (IP) address of the portable communication device is a private IP address;
in response to determining that the assigned IP address of the portable communication device is a private IP address,
querying the WLAN for a public IP address information associated with the WLAN, the public IP address information indicative of a location of the WLAN;
receiving the public IP address information associated with the WLAN from the WLAN;
parsing the public IP address information associated with the WLAN;
extracting a public IP address of the WLAN from the public IP address information associated with the WLAN; and
setting the public IP address of the WLAN as the assigned IP address of the portable communication device; and
registering with the WLAN by providing the public IP address of the WLAN as an assigned IP address of the portable communication device.

5. The method of claim 4, wherein registering with the WLAN comprises:
populating a contact header of a protected registration message with the public IP address of the portable communication device.

6. The method of claim 5, wherein registering with the WLAN comprises:
forwarding the protected registration message to an Internet Protocol Multimedia System (IMS) server associated with the WLAN; and
causing the IMS server to:
extract the public IP address from the protected registration message;
populate the public IP address in via header of another registration message; and
forward the other registration message to other IMS servers communicatively coupled to the WLAN,
wherein information indicative of the location of the WLAN is extractable from the other registration message by the other IMS servers.

7. The method of claim 4, wherein registering with the WLAN comprises:
populating a private field of a protected registration message with the public IP address of the portable communication device.

8. A portable communication device comprising:
one or more processors;
a wireless local area network (WLAN) transceiver communicatively coupled to the one or more processors, the WLAN transceiver configured to communicate with a WLAN;
memory communicatively coupled to the one or more processors, the memory storing instructions and executable by the one or more processors to perform operations comprising:
discovering a WLAN;
determining that an assigned Internet protocol (IP) address of the portable communication device is a private IP address;
in response to determining that the assigned IP address of the portable communication device is a private IP address,
querying the WLAN for a public IP address information associated with the WLAN, the public IP address information indicative of a location of the WLAN;
receiving the public IP address information associated with the WLAN from the WLAN;
parsing the public IP address information associated with the WLAN;
extracting a public IP address of the WLAN from the public IP address information associated with the WLAN; and
setting the public IP address of the WLAN as the assigned IP address of the portable communication device; and
registering with the WLAN by providing the public IP address of the WLAN as an assigned IP address of the portable communication device.

9. The portable communication device of claim 8, wherein the operation of registering with the WLAN comprises:

populating a contact header of a protected registration message with the public IP address of the portable communication device.

10. The portable communication device of claim 8, wherein the operation of registering with the WLAN comprises:
populating a private field of a protected registration message with the public IP address of the portable communication device.

* * * * *